H. S. MILLER, DEC'D.
P. Q. MILLER, ADMINISTRATOR.
AUTOMATIC COUPLING.
APPLICATION FILED JULY 12, 1911.
1,044,802.
Patented Nov. 19, 1912.
3 SHEETS—SHEET 1.
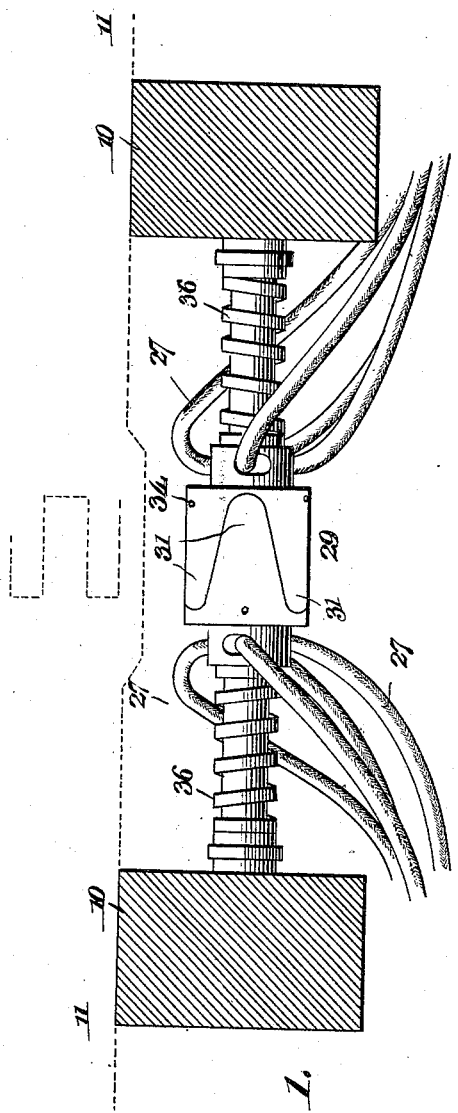
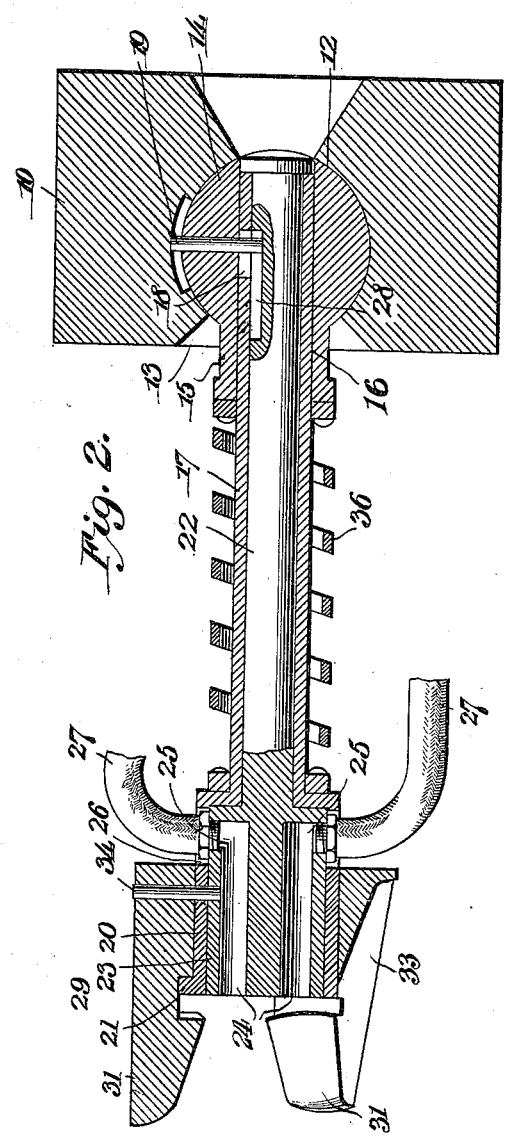
Inventor
Peter Q. Miller,
Administrator of the Estate of Hugh Stanley Miller.
By Victor J. Evans
Attorney
Witnesses H. S. MILLER, DEC'D.
P. Q. MILLER, ADMINISTRATOR.
AUTOMATIC COUPLING.
APPLICATION FILED JULY 12, 1911.
1,044,802.
Patented Nov. 19, 1912.
3 SHEETS—SHEET 2.
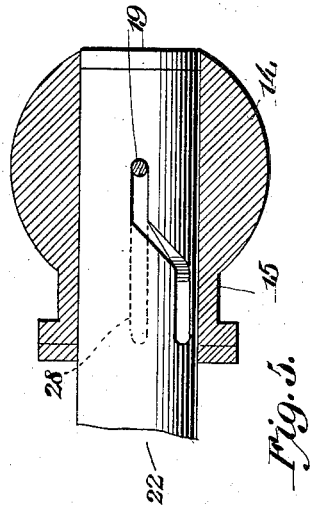
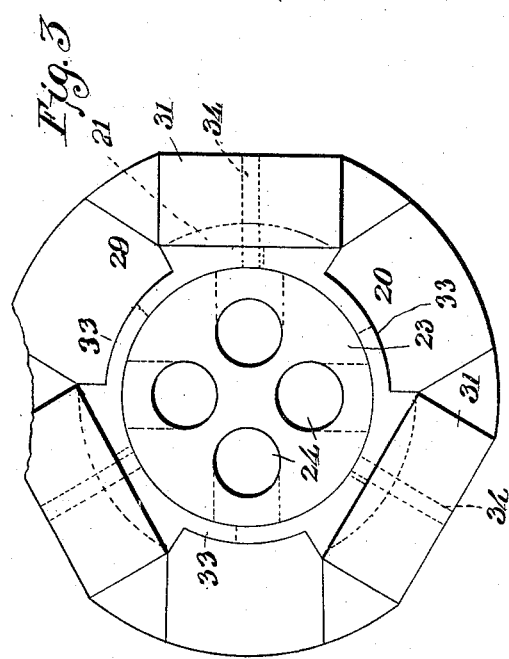
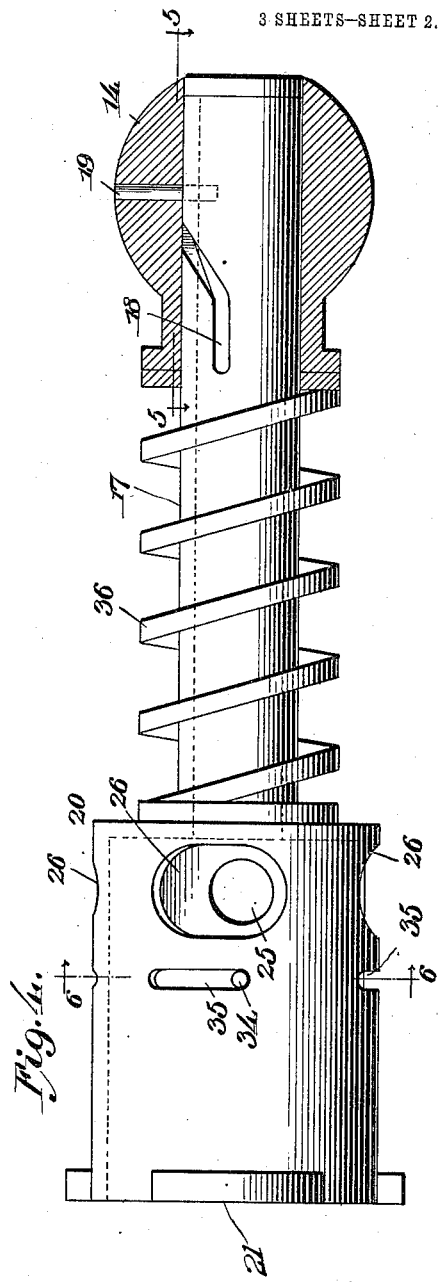
Witnesses
W. B. Galt.
R. H. Hoster
Inventor
Peter Q. Miller,
Administrator of the Estate of Hugh Stanley Miller.
By Victor J. Evans
Attorney

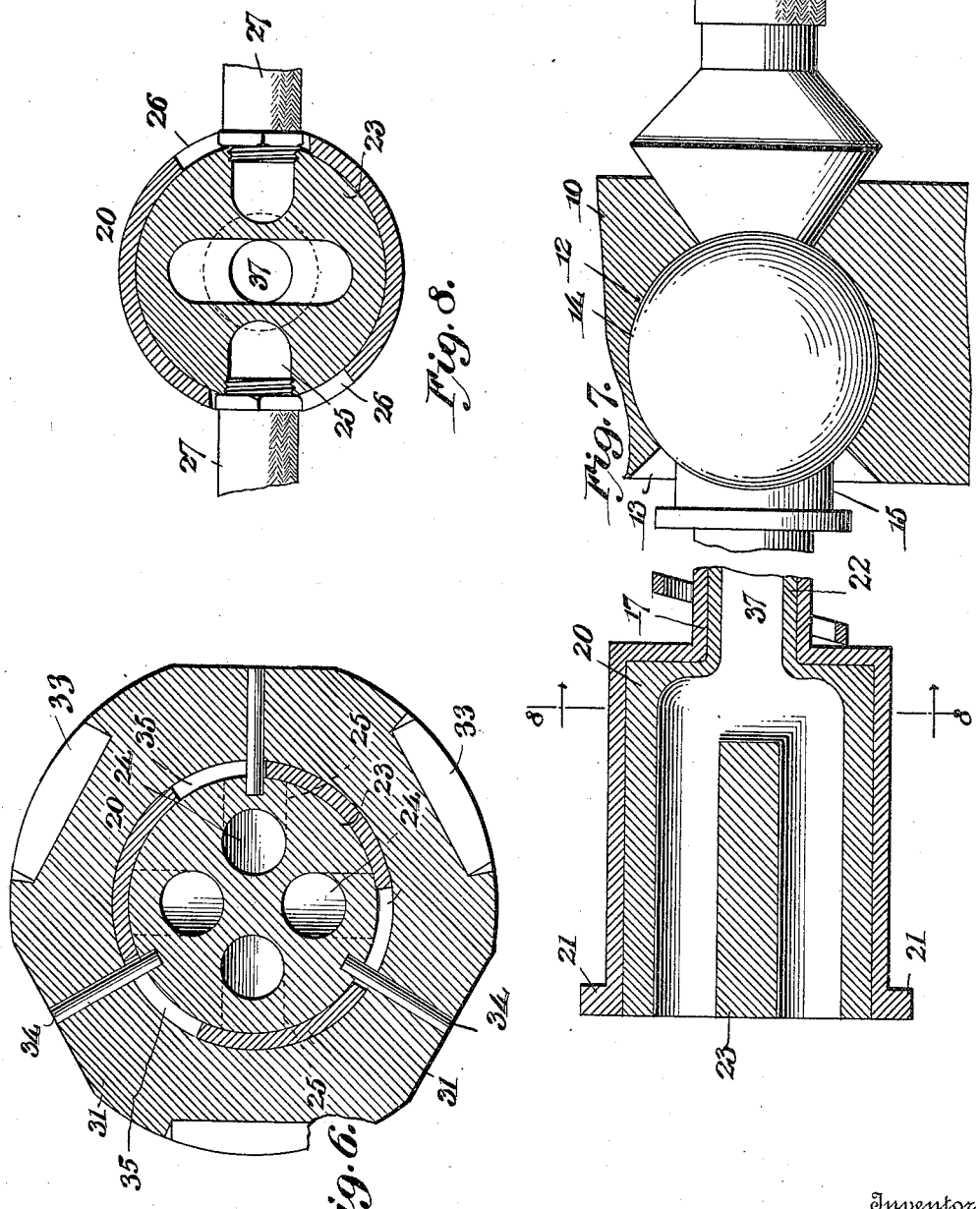

UNITED STATES PATENT OFFICE.

HUGH STANLEY MILLER, DECEASED, LATE OF JOHNSON CITY, TENNESSEE, BY PETER Q. MILLER, ADMINISTRATOR, OF JOHNSON CITY, TENNESSEE.

AUTOMATIC COUPLING.

1,044,802.   Specification of Letters Patent.   Patented Nov. 19, 1912.

Application filed July 12, 1911. Serial No. 638,111.

*To all whom it may concern:*

Be it known that I, PETER Q. MILLER, a citizen of the United States, residing at Johnson City, in the county of Washington and State of Tennessee, am the administrator of the estate of HUGH STANLEY MILLER, deceased, late a citizen of the United States, residing at Johnson City, in the county of Washington and State of Tennessee, who did invent a new Improved Automatic Coupler, of which the following is a full, clear, and exact description.

The invention relates to hose couplings, more particularly adapted for use in connection with railway cars and the like and has for an object to provide a coupler for automatically coupling or uncoupling the service lines of adjacent cars.

For the purpose mentioned, use is made of a rotatable casing for connection with a hanger block conveniently supported on the under side of a car, a service member mounted within the said casing and a guide head mounted to encircle an enlarged end of the casing, the mentioned service member being operable in the hanger block and the mentioned guide head being rigid with the service member, the said casing being rotatable relatively to the service member and guide head and the said service member being provided with service lines, it being understood that my coupler is adapted for connection with a similar coupler on an adjacent car so that the service lines in one coupler will register with relative service lines on the other coupler and the guide head on one coupler will interlock with the guide head on the other coupler.

Reference is to be had to the accompanying drawings constituting a part of this specification, in which similar characters of reference denote corresponding parts in all the views and in which—

Figure 1 is a side elevation of a plurality of my couplings showing the same applied to cars and in interlocking position. Fig. 2 is a vertical sectional view of the coupling members shown in Fig. 1. Fig. 3 is an end view of one of the couplings. Fig. 4 is a fragmentary side elevation of my coupling, parts of the casing being broken away to disclose the underlying structure. Fig. 5 is a horizontal sectional view on the line 5—5 in Fig. 4. Fig. 6 is a vertical sectional view on the line 6—6 in Fig. 4. Fig. 7 is a vertical sectional view of a modified form of my device. Fig. 8 is a vertical sectional view on the line 8—8 in Fig. 7.

Referring more particularly to the views, I provide a hanger block 10 for convenient connection with the under side of a car 11. The hanger is formed with a spherical recess 12 opening by means of a restricted entrance 13 through the forward side of the hanger and in the recess 12 is mounted a spherical body 14 arranged for independent movement therein to provide in effect a universal joint. The spherical body is formed with a sleeve 15 projecting through the entrance opening 13 and serving to limit the up and down movement of the body 14.

The body 14 and the sleeve 15 are formed with an opening 16 extending therethrough to loosely receive a casing 17 provided with a spiral slot 18 through which is slidably extended a pin 19 secured in the spherical body 14 as will be readily seen by referring to Fig. 2.

The casing 17 extends forwardly beyond the hanger block 10 and terminates at the forward end in an enlarged casing head 20, having spaced locking lugs 21 extended from the periphery thereof. Slidably mounted within the casing 17 is a service member 22 preferably cylindrical in shape and terminating at the forward end in a pipe head 23 and formed in the pipe head 23 are service ducts 24, the said service ducts being adapted to extend longitudinally into the service member from the forward end thereof and then extend laterally to the service member to terminate in openings 25 in the sides of the service member. The casing 17 is provided with elongated openings 26 adapted to register with the openings 25 of the service ducts 24 and service lines 27 have their outer ends extended through the elongated openings 26 and openings 25 to connect with the pipe head 23 so that when air or steam is passed through the service ducts 24 the same will pass southwardly through the service lines 27 as will be readily understood.

The service member 22 is provided with a straight slot 28 through which the pin 19 is extended, thus preventing any turning of the service member 22 without in any manner interfering with the rotatable movement of the casing 17, which provided with the spiral slot 18 having the pin 19 extended therethrough, can be rotated relatively to the hanger block 10.

Mounted to partially encircle the casing head 20 is a guide head 29 consisting of a sleeve like member 30 formed with forwardly projecting divergent guide arms 31. Adjacent the juncture of the arms 31 with the sleeve 30 of the guide head 29, the inner surface of each arm is provided with a recess 32 and the outer periphery of the sleeve 30, between the arms 31 is provided with recesses 33.

To insure the proper operation of my device the guide head 29 must remain in stationary position relatively to the casing 17 and as the guide head is mounted on the casing 17 any turning movement of the guide head with the casing is prevented by passing pins 34 through the guide head and through slots 35 formed in the head 20 of the casing 17, the inner ends of the pins 34 being secured in the pipe head 23 of the service member 22. Thus it will be seen that the guide head 29 will be rigid with the service member 22, while the casing 17 will be rotatable relatively to the service member 22 and the guide head 29. Encircling the casing 17 is an expansible spring 36 abutting against the sleeve 15 and the casing head 20.

Now assuming that adjacent cars are each provided with one of my couplers, when the cars are coupled together in the usual manner, the guide arms on one of the couplers will engage the sleeve of the other coupler in the undercut recesses thereof and the locking lugs of one of the casings will extend into the recesses formed adjacent the juncture of the guide arms of the other coupler with the sleeve thereof. This interlocking operation is caused by the casing 17 which when the cars are connected, will rotate owing to the spiral slot 28 through which is slidably extended the pin 19 and as the casing 17 is provided with the locking lugs 21, when the guide heads of adjacent cars engage as mentioned, the rotation of the casing 17 will cause the locking lugs 21 to pass into the recesses formed in the opposing guide heads, thus releasably locking the guide heads and the service ducts 24 of the pipe head 23 will register with the service ducts of the pipe head on the adjacent car. Now as the service lines 27 are connected with the pipe head 23 as heretofore mentioned, when adjacent cars are connected, the service lines of both cars will be connected so that either air or steam in the service line of one car can flow therefrom to the relative service line on the other car.

When the cars are uncoupled in the usual manner, the strain exerted on the guide arms of both couplers when the cars are parted will cause the casings of both couplers to rotate, thus releasing the locking lugs from engagement with their relative recesses so that the couplers will be disengaged as will be readily understood, the springs 36, being provided to normally retain the outer end of the coupling in spaced relation to the hanger block and assist in locking adjacent couplings.

In Fig. 7 I disclose a modified form of my device and in which, instead of having all of the service lines connected to the pipe head 23 I employ a tubular service member to constitute a service line 37, which extends longitudinally within the service member, the mentioned service line being connected to the usual pipe on the car in any convenient manner, thus reducing the number of service lines connected to the pipe head.

From the foregoing description it will be seen that an efficient and durable coupling is provided and which is automatically operated when adjacent cars are coupled together, and although for the purpose of describing my automatic coupling I have shown the particular constructions thereof, it will be understood that the scope of the invention is defined in the appended claims.

Having thus fully described the invention, what I claim as new, is:—

1. A coupler comprising a service member provided with an enlarged head having service ducts therein, the said service member being provided with a longitudinally extending slot, a casing mounted to encircle the service member and provided with a spiral slot, a hanger block having connection with the under side of a car, a pin engaging the hanger block, the said pin being extended through the spiral slot in the said casing and the longitudinally extending slot in the said service member so that the said casing will rotate relatively to the service member, an enlarged head formed on the said casing and provided with openings adapted to receive service lines therethrough for connection with the service ducts in the head of the service member, locking lugs formed on the head of the said casing, a guide head mounted to encircle the head of the said casing and provided with a recess adapted to receive the said locking lugs and pins mounted on the said guide head, the said pins being loosely extended through slots in the head of the said casing and secured to the head of the said service member to retain the said guide head in rigid position relatively to the said service member.

2. A coupler comprising a hanger block connected to a car, a casing mounted for independent movement in the said hanger block, a service member mounted within the said casing, a guide head mounted to encircle the said casing and pins secured to the said guide head and extending through slots in the said casing, the said pins being secured to the said service member to retain the said guide head in rigid position relatively to the said service member.

3. A coupler comprising a hanger block, a pin engaging said hanger block, a casing provided with a spiral slot and slidably mounted to extend through the hanger block with the said pin extended through the spiral slot in the said casing, locking lugs formed at one end of the said casing, a service member mounted within the said casing and provided with a longitudinally extending slot through which the said pin is extended, a head formed on the said service member and provided with service ducts for connection with the service lines, a guide head mounted to encircle the said casing and pins secured to the said guide head and extended through slots in the said casing, the inner ends of the said pins being secured to the ends of the said service member to rigidly connect the said guide head with the head of the said service member.

4. A coupler comprising a service member, a casing mounted to encircle the service member and rotatable thereon, a hanger block for connection with a car and adapted to loosely receive the said casing, a head formed on the said service member and provided with a series of service ducts, a head formed on the said casing and encircling the head of the said service member, locking lugs formed on the head of the said casing and a guide head mounted to encircle the head of the said casing, the said guide head being rigidly connected with the head of the said service member to permit rotation of the said casing and the head thereof.

5. A coupler comprising a service member, a casing mounted to loosely encircle the said service member and provided with a spiral slot, a hanger block, a pin engaging the said hanger block and extending through the said spiral slot, the said pin having connection with the said service member to permit a rotation of the said casing relatively to the said service member and said hanger block, a guide head loosely mounted at one end of the said casing and rigidly secured to the said service member and locking lugs formed on the said casing, between the said guide heads, said guide head and said locking lug being adapted for interlocking engagement with a similar guide head and similar locking lugs on an adjacent car.

6. A coupler comprising a hanger block, a pin extending within the said hanger block, a casing provided with a spiral slot and slidably mounted in the hanger block with the said pin extended through the said spiral slot, a service member mounted within the said casing and provided with a longitudinally extending slot through which the said pin is extended, a head formed on the said service member and provided with service ducts for connection with service lines, a guide head mounted to loosely encircle the said casing and rigidly connected to the said service member and locking means formed at one end of the said casing, adjacent the said guide head.

7. A coupler comprising a hanger block, a pin extending within the said hanger block, a casing provided with a spiral slot and slidably mounted in the hanger block with the said pin extended through the said spiral slot, a service member mounted within the said casing and provided with a longitudinally extending slot through which the said pin is extended, a head formed on the said service member and provided with service ducts for connection with service lines and locking means formed at one end of the said casing.

8. A coupler comprising a hanger block, a casing rotatably mounted on the said hanger block, a service member mounted within the said casing, the said casing being rotatable relatively to the said service member, a head formed on the said service member and provided with service ducts for connection with service lines, a guide head mounted to loosely encircle the said casing and secured to the said service member and locking means formed at one end of the said casing adjacent the said guide heads.

9. A coupler comprising a hanger block, a casing rotatably mounted on the said hanger block, a service member mounted within the said casing, the said casing being rotatable relatively to the said service member, a head formed on the said service member and provided with service ducts for connection with service lines, a guide head mounted to loosely encircle the said casing and secured to the said service member and spaced locking lugs formed at one end of the said casing adjacent the said guide heads.

10. In a coupler a casing for rotatable engagement with a hanger block, a service member mounted within the said casing and provided with service ducts, the said casing being rotatable relatively to the said service member, a guide head mounted to loosely encircle the said casing and locking means formed on the said casing for locking the said guide head with an adjacent coupler.

11. In a coupler a casing for rotatable engagement with a hanger block, a service member mounted within the said casing and provided with service ducts, the said casing being rotatable relatively to the said service member, a guide head mounted to loosely encircle the said casing and spaced laterally extending locking lugs formed on the said casing for locking the said guide head with an adjacent coupler.

PETER Q. MILLER,
*Administrator of the estate of Hugh Stanley Miller, deceased.*

Witnesses:
C. M. SNODGRASS,
S. S. FAIN.

Copies of this patent may be obtained for five cents each, by addressing the "Commissioner of Patents, Washington, D. C."